United States Patent
Drew

(10) Patent No.: US 7,526,340 B2
(45) Date of Patent: Apr. 28, 2009

(54) DIVISION APPROXIMATION FOR IMPLANTABLE MEDICAL DEVICES

(75) Inventor: Touby A. Drew, Minneapolis, MN (US)

(73) Assignee: Medtronic, Inc., Minneapolis, MN (US)

( * ) Notice: Subject to any disclaimer, the term of this patent is extended or adjusted under 35 U.S.C. 154(b) by 323 days.

(21) Appl. No.: 10/976,474

(22) Filed: Oct. 29, 2004

(65) Prior Publication Data
US 2006/0094973 A1    May 4, 2006

(51) Int. Cl.
*A61N 1/36* (2006.01)
(52) U.S. Cl. .......................................... 607/45
(58) Field of Classification Search .................. 600/300, 600/301, 508–528; 607/1–46
See application file for complete search history.

(56) References Cited

U.S. PATENT DOCUMENTS

| | | | |
|---|---|---|---|
| 3,828,175 A | | 8/1974 | Amdahl et al. |
| 4,035,622 A | * | 7/1977 | Obermajer .................. 600/526 |
| 5,515,308 A | | 5/1996 | Karp et al. |
| 5,563,818 A | | 10/1996 | Agarwal et al. |
| 5,951,483 A | * | 9/1999 | Joo ............................ 600/509 |
| 5,995,868 A | | 11/1999 | Dorfmeister et al. |
| 6,643,323 B1 | | 11/2003 | Allred |
| 6,978,184 B1 | * | 12/2005 | Marcus et al. .............. 607/120 |
| 2002/0016808 A1 | | 2/2002 | Pelton et al. |
| 2004/0138536 A1 | | 7/2004 | Frei et al. |

OTHER PUBLICATIONS

Motorola's AN974 document [online], "MC68HC11 Floating-Point Package," Retrieved from http://www.freescale.com/files/microcontrollers/doc/app_note/AN974.pdf.

"68HC11 Introduction," adapted by Harry Broeders from the "Introduction to 6811 Programming" written by Fred Martin, [online, retrieved on Sep. 1, 2004], Retrieved from http:/bd.thrijswijk.nl/mccal/68hc11_intro.htm.

Technical reference [online, retrieved on Sep. 1, 2004], Retrieved from http://www.hc11.demon.nl/thrsim11/68hc11/tech.htm.

"Doing It Fast," [online], [retrieved on Aug. 26, 2004], Retrieved from http://www.gameprogrammer.com/4-fixed.html.

Andreas Göbel: "Polynomdivision für Casio Rechner" [Online] Mar. 17, 2004, pp. 1-4, XP002323053 Retrieved from the Internet: URL:http://www.diaware.de/html/casio.html> [retrieved on Apr. 1, 2005].

(Continued)

*Primary Examiner*—George R Evanisko
(74) *Attorney, Agent, or Firm*—Fredrikson & Byron, PA

(57) ABSTRACT

Methods and devices for performing division approximation in implantable and wearable self-powered medical devices. The present invention provides rapid methods for performing an approximation of division on fixed point numbers, where the methods are easily implemented in small, low power consumption devices as may be found in implantable medical devices. One example of use is in rapidly determining the approximate ratio between foreground and background activity in seizure detection algorithms. Some methods approximate the ratio of Numerator (N) to Denominator (D) by raising 2 to the power of the difference in the number of zeros to the left of the Most Significant Set Bit (MSSB) of D vs. N. Some methods may also pad bits to the right of the approximate ratio MSSB using bits from the right of the N MSSB, and/or pre-process the smaller of D or N by rounding the value upward. Methods may be implemented in firmware and/or in discrete logic.

30 Claims, 4 Drawing Sheets

OTHER PUBLICATIONS

Universität Oldenburg: "Rechnernetze" [Online] Mar. 14, 2004, pp. 1-4, XP002323054 Retrieved from the Internet: URL:http://einstein.informatik.uni-oldenburg.de/rechnernetze/darstell1.htm> [retrieved on Apr. 1, 2005].

Pädagogische Hochschiule Ludwigsburg: "Schätzen und Überschlagen" [Online] Mar. 25, 2004, pp. 1-4, XP002323055 Retrieved from the Internet: URL:http://www.ph-ludwigsburg.de/VERALTET/mathematik/forschung/nctm/stk4/s05.html.

* cited by examiner

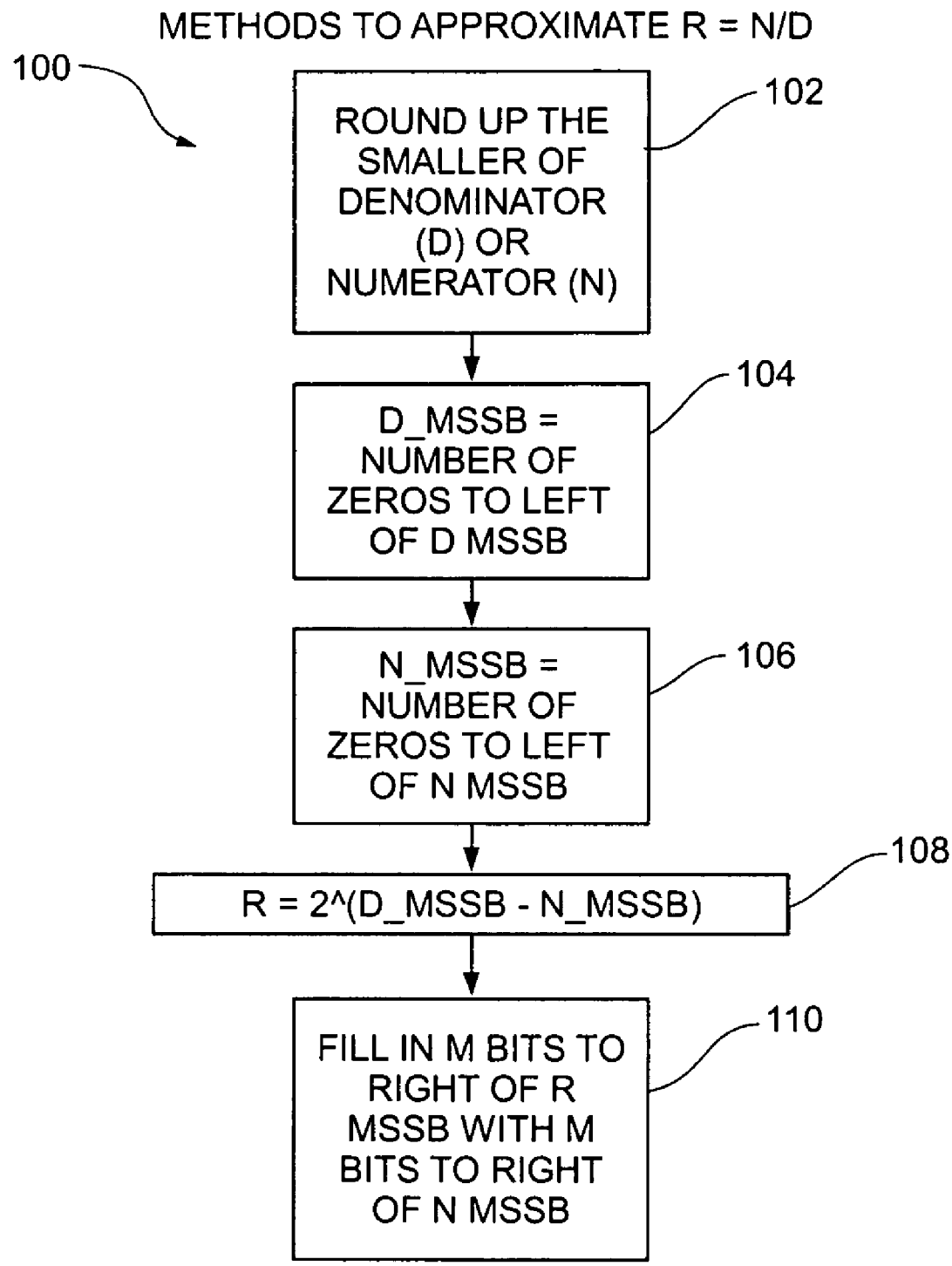

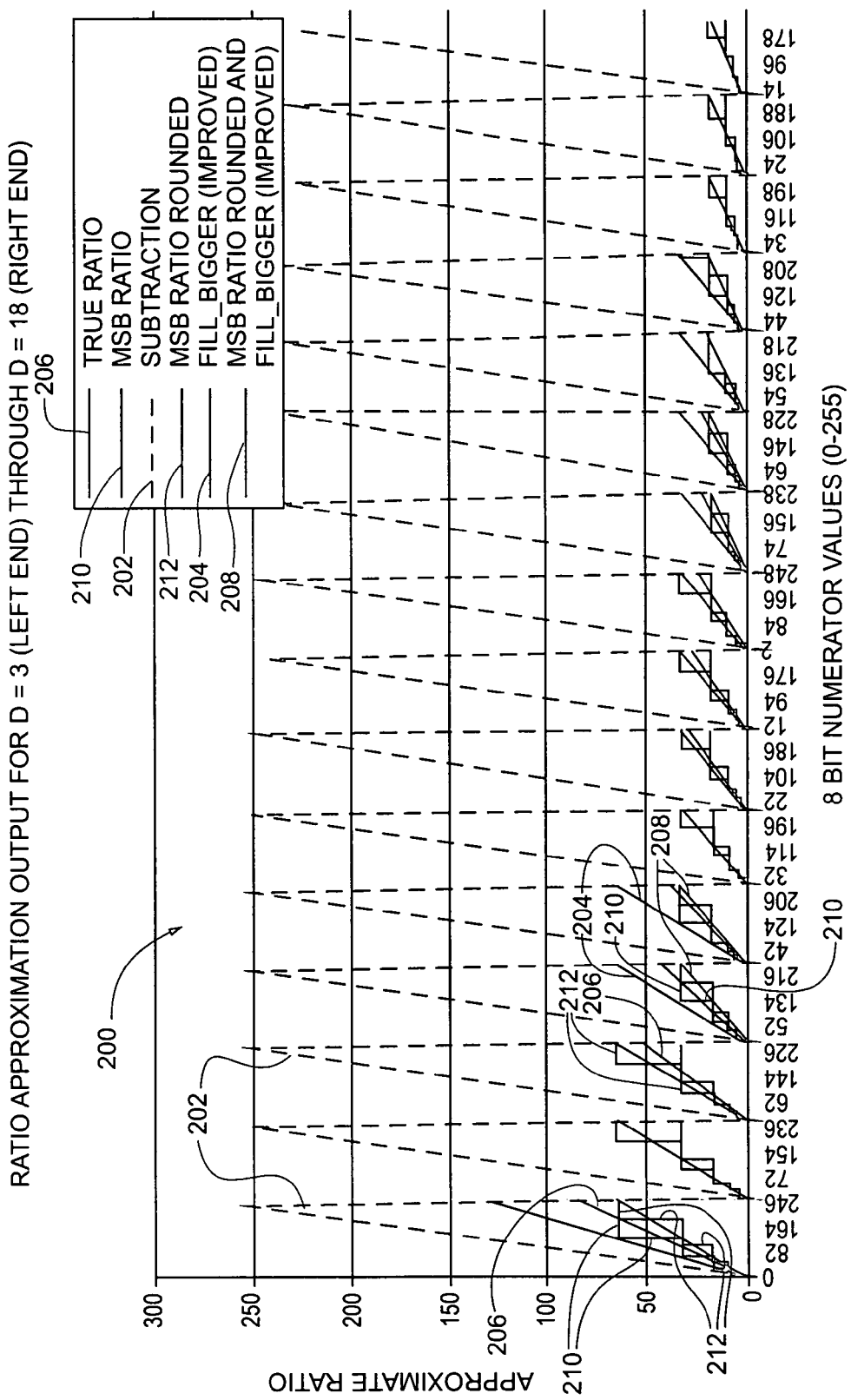

DIVISION APPROXIMATION FOR IMPLANTABLE MEDICAL DEVICES

FIELD OF THE INVENTION

The present invention is related generally to implantable medical devices. More specifically, the present invention is related to software and/or hardware methods that can be used to approximate division in implantable medical devices.

BACKGROUND OF THE INVENTION

People in the industrialized world are living longer and healthier lives on average than previously possible. People do still become ill and fall victim to various illnesses however. Modern medicine utilizes various treatments, substances, and devices for treating people. Some methods include the use of implantable medical devices (IMDs). IMDs include pacemakers, cardioverters, drug pumps, neurological stimulators, and other devices well known to those skilled in the art. Some other devices are ambulatory or wearable devices, allowing the patients to wear the devices external to the body, but may have a lead and/or delivery catheter implanted in the body. Examples of wearable devices include insulin pumps and spinal neurological devices to alleviate pain. IMDs and wearable devices have been increasingly used to treat neurological disorders.

Nervous system disorders affect millions of people, causing death and a degradation of life. Nervous system disorders include disorders of the central nervous system, peripheral nervous system, and mental health and psychiatric disorders. Such disorders include, for example without limitation, epilepsy, Parkinson's disease, essential tremor, dystonia, and multiple sclerosis (MS). Additionally, nervous system disorders include mental health disorders and psychiatric disorders which also affect millions of individuals and include, but are not limited to, anxiety (such as general anxiety disorder, panic disorder, phobias, post traumatic stress disorder (PTSD), and obsessive compulsive disorder (OCD), mood disorders (such as major depression, bipolar depression, and dysthymic disorder), sleep disorders (narcolepsy), obesity, and anorexia. As an example, epilepsy is the most prevalent serious neurological disease across all ages. Epilepsy is a group of neurological conditions in which a person has or is predisposed to recurrent seizures. A seizure is a clinical manifestation resulting from excessive, hypersynchronous, abnormal electrical or neuronal activity in the brain. (A neurological event is an activity that is indicative of a nervous system disorder. A seizure is a type of a neurological event.) This electrical excitability of the brain may be likened to an intermittent electrical overload that manifests with sudden, recurrent, and transient changes of mental function, sensations, perceptions, and/or involuntary body movement. Because the seizures are unpredictable, epilepsy affects a person's employability, psychosocial life, and ability to operate vehicles or power equipment. It is a disorder that occurs in all age groups, socioeconomic classes, cultures, and countries. In developed countries, the age-adjusted incidence of recurrent unprovoked seizures ranges from 24/100,000 to 53/100,000 person-years and may be even higher in developing countries. In developed countries, age specific incidence is highest during the first few months of life and again after age 70. The age-adjusted prevalence of epilepsy is 5 to 8 per 1,000 (0.5% to 0.8%) in countries where statistics are available. In the United States alone, epilepsy and seizures affect 2.3 million Americans, with approximately 181,000 new cases occurring each year. It is estimated that 10% of Americans will experience a seizure in their lifetimes, and 300 will develop epilepsy by age 75.

There are various approaches in treating nervous system disorders. Treatment therapies can include any number of possible modalities alone or in combination including, for example, electrical stimulation, magnetic stimulation, drug infusion, and/or brain temperature control. Each of these treatment modalities can be operated using closed-loop feedback control. Such closed-loop feedback control techniques receive from a monitoring element a neurological signal that carries information about a symptom or a condition or a nervous system disorder. Such a neurological signal can include, for example, electrical signals (such as EEG, ECoG, and/or EKG), chemical signals, other biological signals (such as change in quantity of neurotransmitters), temperature signals, pressure signals (such as blood pressure, intracranial pressure or cardiac pressure), respiration signals, heart rate signals, pH-level signals, and peripheral nerve signals (cuff electrodes on a peripheral nerve). Monitoring elements can include, for example, recording electrodes or various types of sensors.

For example, U.S. Pat. No. 5,995,868 discloses a system for the prediction, rapid detection, warning, prevention, or control of changes in activity states in the brain of a patient. Use of such a closed-loop feed back system for treatment of a nervous system disorder may provide significant advantages in that treatment can be delivered before the onset of the symptoms of the nervous system disorder.

In the management of a nervous system disorder, it may be important to determine an extent of a neurological event, a location of the neurological event, a severity of the neurological event, and the occurrence of multiple neurological events in order to provide a delivery of a treatment or otherwise manage the neurological disorder. A patient, for example, would not benefit from a medical device system if the patient experienced a neurological event but was not administered treatment because the medical device system did not detect the neurological event. On the other hand, the patient may have adverse effects if the patient were subjected to a degree of treatment corresponding to multiple neurological events, such as seizures, even though the patient had only one neurological event in actuality. The field of medical device systems in the treatment of nervous system disorders would benefit from methods and apparatus that determine the extent, location, severity, and time of a neurological event or a plurality of neurological events.

Algorithms, methods, and systems for seizure detection and other neurological detection have been developed. Many such algorithms rely on modern computers, as may be expected. Sophisticated signal processing methods may be employed and digital signal processing (DSP) hardware may be used. Software engineers have become accustomed to using currently available computers, having ever faster processors and ever increasing memory. At the time of filing the present application, for example, Pentium 4 processors running at 3 GHz are not uncommon, even for personal use. Attempts or suggestions to shave clock cycles off algorithms, for example division algorithms, may seem quaint and somewhat antiquated.

Both floating point and fixed point division algorithms are commonly used. While precision and range are certainly sacrificed, fixed point division is far faster than floating point division. Take for example the MC68HC11 processor, a very powerful and capable single-chip microcontroller, used by Medtronic in some IMDs including implantable neurostimulators. A fixed point integer division takes 41 clock cycles, while a floating point division takes 2911 clock cycles in the worst case. The fixed point routine is built into the circuitry of the microprocessor and returns a result and a remainder value. The floating point routine, being much more complicated, requires a subroutine that is about 209 bytes in size and returns a floating value or error indication. This subroutine further calls several other floating point subroutines, requiring more space, and adding 11 bytes to the stack.

Approximation of floating point division is far faster than floating point division but slower or about the same as fixed point division. While again something is certainly sacrificed, approximate floating point division is far faster than floating point division. This "approximation" can be done in numerous ways often involving fixed point division with a number that has been shifted or multiplied up, to allow for some precision retention at the cost of range or bit-width in fixed point.

In implantable medical devices, the clock speed is often severally restricted due to the need for long battery life in these self-powered devices, which can be measured in years. The space available for circuitry may also be severely limited. For these reasons, implantable devices have often used fixed point math.

Such implantable devices may nonetheless be required to do a great deal of computation in real time. In one example, a device sampling 8 electrical signals at 200 Hz, and running a detection algorithm that involves division, could require that once every $200^{th}$ of a second the device needs to perform division on at least eight samples. A seizure detection algorithm can require just such a large number of divisions per second. It may not even be possible to perform the required number of divisions in the allotted time, using current methods, in implanted devices.

What would be desirable are methods for performing division approximation that require fewer clock cycles than current implanted medical device methods. What would be advantageous are division approximation methods that can be implemented on simple microprocessors and/or discrete logic, and that can be operated at the low power consumption levels most suited for implanted medical devices.

SUMMARY OF THE INVENTION

The present invention provides methods and apparatus for performing approximation of fixed point division. These methods can be performed in a smaller number of clock cycles than conventional fixed point division methods. While methods according to the present invention may not be as accurate as conventional methods, the accuracy is suitable for many applications. Some embodiments of the inventions can be implemented in discrete logic and/or in microprocessor machine code.

Embodiments of the present invention may be used in dividing numbers derived from physiological sources in determining or analyzing signal to noise ratios. Some embodiments of the present invention can be used to perform multiple divisions per second as part of neurological seizure detection algorithms.

One embodiment of the invention provides an apparatus and method to determine a detection cluster that is associated with a neurological event, such as a seizure, of a nervous system disorder. A set of neurological signals, in which each neurological signal corresponds to a monitoring element, such as an electrode, is received and analyzed. A measure, such as a ratio that relates a short-term value to a long-term value, can be calculated for each neurological signal. The maximal ratio is the largest ratio for the set of neurological signals at an instance of time. The occurrence of the detection cluster is determined when the maximal ratio exceeds an intensity threshold for at least a specific duration. If the maximal ratio drops below the intensity threshold for a time interval that is less than a time threshold and subsequently rises above the intensity threshold, the subsequent time duration is considered as being associated with the same detection cluster rather than being associated with a different detection cluster. Consequently, treatment of the nervous system disorder during the corresponding time period is in accordance with one detection cluster.

Some embodiments of the present invention provide a method for detecting a seizure in an implantable medical device (IMD) utilizing an algorithm (in one example, an Osorio-Frei type algorithm) having a plurality of ratio determinations of foreground seizure energies divided by background seizure energies. The method can use a ratio estimation in place of fixed point division to determine a majority of the ratios. The ratio estimation can include estimating a Numerator (N) divided by a Denominator (D), where the estimating includes obtaining a result as a function of 2 raised to the power of the difference between the most significant set bit position (MSSB) of the D and the MSSB of the N. Some such methods further include setting a bit just to the right of the ratio MSSB to equal the value of a bit just to the right of the N MSSB. Methods may also include first rounding up the smaller of N or D and using the N or D in the ratio approximation. After estimating the ratio, an indication of seizure detection can be generated at least in part as a function of the ratio estimating. The indication can be a set or cleared bit or flag, a changed memory location value, or any other changed state, depending on the embodiment.

Some methods according to the present invention can be used to detect a seizure in an implantable medical device by obtaining a first plurality of electrical signal samples indicative of seizure energy over a time first time window, and obtaining a second plurality of electrical signal samples indicative of seizure energy over a second time window, where the second time window is longer in duration and extends further into the past relative to the first window. The method can include approximating a ratio by raising 2 to the power of the difference in most significant set bit positions of the first signal and the second signal.

Some embodiments of the present invention provide a method for determining a ratio approximation in a self-powered implantable or wearable medical device. The method can include obtaining a first fixed point number (N) indicative of a first physiological parameter measurement, obtaining a second fixed point number (D) indicative of a second physiological parameter measurement, and calculating the ratio of N/D by using a method consisting essentially of raising 2 to the power of the difference between the most significant set bit positions of the first number and the second number. In some such methods the first and second physiological parameter measurements are both derived from the same physiological source, but the first physiological parameter is indicative of a background level and the second physiological parameter is indicative of a more recent measurement than the first. The first and second physiological parameters may both be derived from the same source but over different time periods.

Methods according to the present invention can be used generally for performing a division approximation of a denominator by a numerator as a function of determining a first number of zero bits more significant than the Most Significant Set Bit (MSSB) of the denominator, determining a second number of zero bits more significant than the numerator MSSB, and raising the difference between the first number and the second number to the second power. The method may further include filling a least one bit to the right of the MSSB of the ratio approximation result with at least one corresponding bit to the right of the MSSB of the denominator. In some methods, the smaller of the denominator or numerator may be rounded up before being used in the ratio approximation. In one view of some methods of the invention, determining the MSSB position of the numerator and/or denominator constitutes an approximation of the numerator and/or denominator, respectively.

The present invention also includes computer readable media having executable instructions for executing methods according to the present invention. The present invention further includes implantable and wearable medical devices having executable logic or programs within for executing methods according to the present invention. Some devices can include microprocessors executing machine code embodying a method according to the present invention, other devices include discrete logic formed according to such methods, and still other devices include both machine code programs and discrete logic.

DESCRIPTION OF THE DRAWINGS

FIG. 3 is a flowchart of method(s) for approximating fixed point division that can be executed in the IMDs of FIGS. 1 and 2; and FIG. 4 is a plot of results for the fixed point division approximation methods of FIG. 3.

DETAILED DESCRIPTION OF THE PREFERRED EMBODIMENTS

Figure 1:
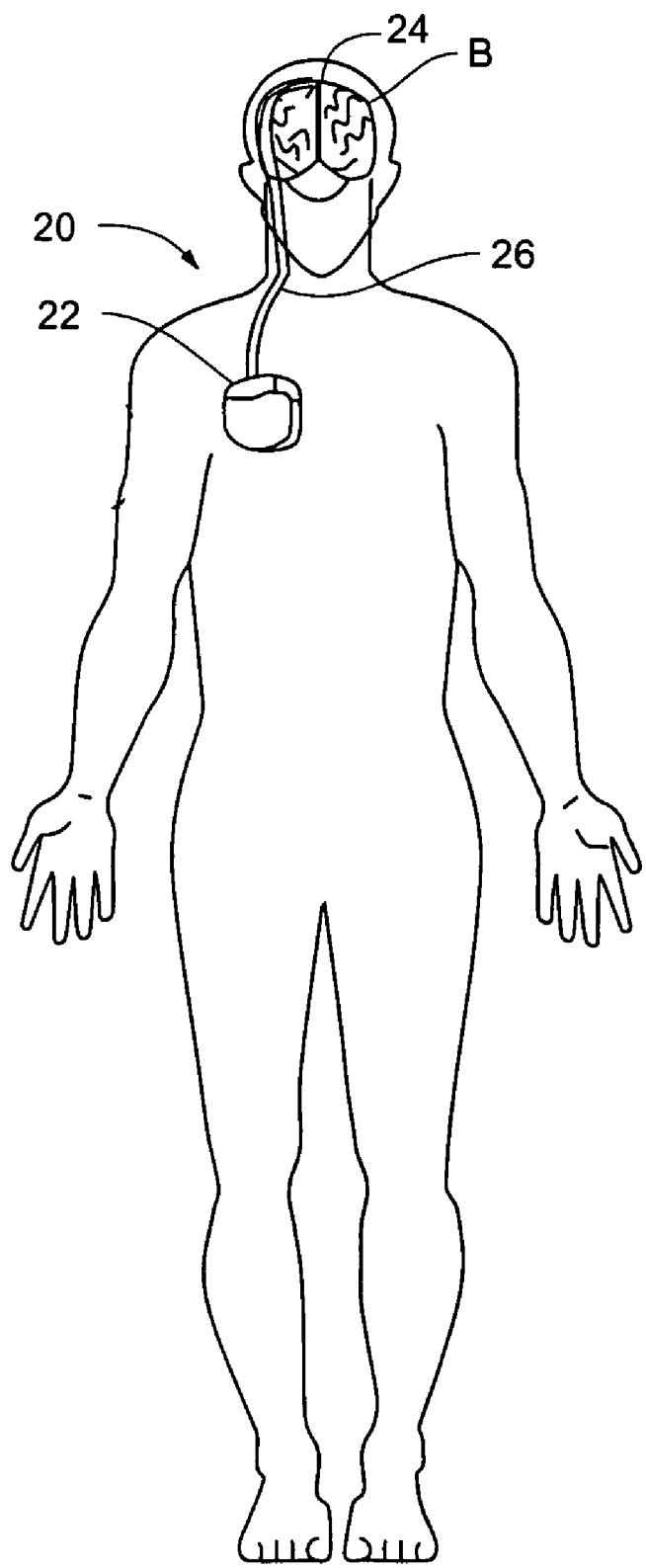
FIG. 1 is a front view of a neurological Implantable Medical Device (IMD) that can include the present invention.

Approximation of fixed point division can take several forms. One choice to replace division, to determine how much larger or smaller a potential numerator is than a potential denominator, is subtraction. Subtraction takes somewhere from 2 to 7 clock cycles and doesn't require one to operate on anything but a single number, e.g. no remainder to worry about, and no division by zero problems. Subtraction, however does not track the slope of the division curve very well. That is, subtraction really isn't that good an approximation of division, and while it may seem comparably simple at a fraction of the clock-cycles, it's still somewhat complicated when it comes to having to "carry the one" and so forth.

Another way to approach approximating division is to think of the numbers in binary; that is to think of them as a string of 1's and 0's representing a value. For the purpose of this discussion we will consider the Least Significant Bit (LSB) as the bit shown the farthest to the right. The LSB determines whether the number is even or odd. If the LSB is set (1) and no other bits are set the value will be "1" in decimal numbers; if the LSB is not set (0) and no other bits are set the value will be zero. The next bit to the left of the LSB is the "two's place"; for example the number "11" is 3, the number "10" is 2, and as we know the numbers "01" and "00" are 1 and 0 respectively. We will view the Most Significant Bit (MSB) as the number farthest to the left. There may not be a "left" and "right" in memory, but such descriptions make visualizing the present invention easier.

Now it may not be apparent, but by determining how far apart the Most Significant Set (1) Bits (MSSBs) are in a potential numerator and denominator is a useful reflection of their ratio. The MSSB value may be viewed as the number of left shifts required to remove the MSSB from the number. Other views and methods are also possible. One example of using this approximation is given below.

If the numerator is "0000 0101" (which is 5 in decimal), the MSSB of the numerator is 6, and the denominator is "0000 1000" (which is 8 in decimal), the MSSB of the denominator is 5. Thus we could say that the ratio is approximately $2^{(Denominator\_MSSB-Numerator\_MSSB)}=2^{(5-6)}=2^{(-1)}=0.5$. We get the $-1$ because of the number of binary digits the MSSBs are apart and the negative sign because the denominator MSSB is left of the numerator MSSB. This coarse, power of two approximations, is okay and is extremely fast, but may provide the desired quality. This and other approximations are described below in more practical terms.

One method can include left shifting the numerator until the MSSB is determined by incrementing a counter, then doing the same to the denominator.

EXAMPLE

MSSB—Most significant set bit
N—numerator
D—denominator
For example:
N=8=0000 1000b
D=5=0000 0101b
D_MSSB=6
N_MSSB=5
Approximate ratio=2(D_MSSB−N_MSSB)=2(6−5)=2(1)=2

Note this can also be implemented (perhaps more simply) by incrementing and decrementing the same accumulator.
For example:
N=12=0000 1100b
D=5=0000 0101b Increment the accumulator acc for each left shift required to find the denominator MSSB then decrement the accumulator for each left shift required to find the numerator MSSB.
acc=0+1+1+1+1+1+1−1−1−1−1−1=1 or, in the opposite order
acc=0−1−1−1−1−1+1+1+1+1+1+1=1
Approximate ratio=21=2

In another view of this approximation method, initialize a counter to 0. Then, starting at the Most Significant Bit (MSB) of the N, for every leftwise bit shift required until the MSB of the N is 1, decrement the counter. Then, starting at the Most Significant Bit (MSB) of the D, for every leftwise bit shift required until the MSB of the D is 1, increment the counter. Then, a first approximation of N/D, is equal to 2(counter).

For better precision, the bits following the first ratio bit can be filled in by right filling the zeros of the result of the procedure above. This filling in may use the number of bits equal to the absolute value of the difference between the N_MSSB and the D_MSSB (which is stored in the result obtained above). These bits are filled in from the bits following the MSSB of the N.
For Example:
N=25=0001 1001b
D=5=0000 0101b
acc=0−1−1−1+1+1+1+1+1=2
Approximate ratio=2^2=4=100b Note that there are 2 zero bits to the right of the MSSB of the ratio above. These 2 zero bits may be filled by the 2 bits to the right of the MSSB of the numerator. Alternatively, only 1 zero bit to the right of the MSSB of ratio may be filled. The method is referred to herein as "with filling."

Thus, the improved Approximate ratio (with filling)=110b=6

One view of this method is described below:

Take the first ratio approximation, and, for every bit to the right of the MSSB of the first ratio approximation, do a bitwise OR with the bit to the right of the MSSB of the N, until the LSB of the first ratio approximation has been bitwise ORed.

To further improve the division, a "round-up" scheme could be used based on the numerator and/or most significant not used bit of the denominator. The round up can be based on the smaller of N or D. This round can be done to pre-process the smaller of the N or D, before using the N and D in the ratio approximation. This scheme is referred to here as "with rounding". One way of rounding a number in binary is to add 1 to the bit to the right of the MSSB.

For example:
N=96=0110 0000b
D=15=0000 1111b
acc=0−1+1+1+1+1=3
Approximate ratio=2^(5−2)=2^3=8=1000b
Improved Approximate ratio (with filling)=1100b=12
Further Improved ratio (with filling and rounding):
First round up D, which is the smaller of N and D, from 00001111b to 00010000b
Then acc=0−1+1+1+1=2
Then Approximate ratio (with rounding)=2^(4−2)=2^2=4=100b
Then Improved Approximate ratio (with filling)=110b=6

FIG. 1 shows an embodiment of an implanted system 20 for treatment and/or detection of a nervous system disorder in accordance with one embodiment of the invention. As discussed, although the implanted system 20 is discussed in the context of providing brain stimulation, it will be appreciated that the implanted system 20 may also be used to provide other treatment therapies at the brain or head or at other locations of the body. The implanted system 22 generally includes an implanted device 22 coupled to one or more therapy delivery elements 24 through a lead or catheter 26. The therapy delivery elements 24, of course, may also serve as monitoring elements to receive a neurological signal. The implanted device 22 may continuously or intermittently communicate with an external programmer (e.g., patient or physician programmer) via telemetry using, for example, radio-frequency signals. In this embodiment, each of the features and functionalities discussed herein are provided by the implanted device 20.

Those skilled in the art will appreciate that the self-powered medical device systems described herein may take any number of forms from being fully implanted to being mostly external or wearable and can provide treatment therapy to neural tissue in any number of locations in the body. Some embodiments are wearable, ambulatory systems, having a catheter and/or lead attached onto or into the body of wearer, allowing free movement. The implantable or wearable systems are self-powered, relying on a portable power source, allowing for free movement, but not having unlimited power available to support computationally expensive algorithms. For example, the medical device systems described herein may be utilized to provide vagal nerve stimulation, for example, as disclosed in U.S. Pat. No. 6,341,236 (Osorio, et al.). In addition, the treatment therapy being provided by the medical device systems may vary and can include, for example, electrical stimulation, magnetic stimulation, drug infusion, and/or brain temperature control (e.g., cooling).

Moreover, it will be appreciated that the medical device systems may be utilized to analyze and treat any number of nervous system disorders. For example, various U.S. patents assigned to Medtronic provide example of nervous system disorders that can be treated. In the event that closed-loop feedback control is provided, the medical device system can be configured to receive any number of neurological signals that carry information about a symptom or a condition or a nervous system disorder. Such signals may be provided using one or more monitoring elements such as monitoring electrodes or sensors. For example, U.S. Pat. No. 6,227,203, assigned to Medtronic, Inc., provides examples of various types of sensors that may be used to detect a symptom or a condition or a nervous system disorder and responsively generate a neurological signal and is incorporated herein in its entirety.

Referring again to FIG. 1, leads 26 can be coupled at a distal end to electrodes that sense brain activity of the patient and deliver electrical stimulation to the patient. At a proximal end, leads 26 can be coupled to implantable device 22. The connection between leads 26 typically occurs under the scalp on top of the cranium at a convenient location such as behind and above the ear. An external device, for example, an external wearable digital signal processing unit, may also be coupled to IMD 22 to receive sampled signals from the implantable device 22, detects seizures, and send signals to the implantable device 22 to initiate stimulation therapy.

Figure 2:
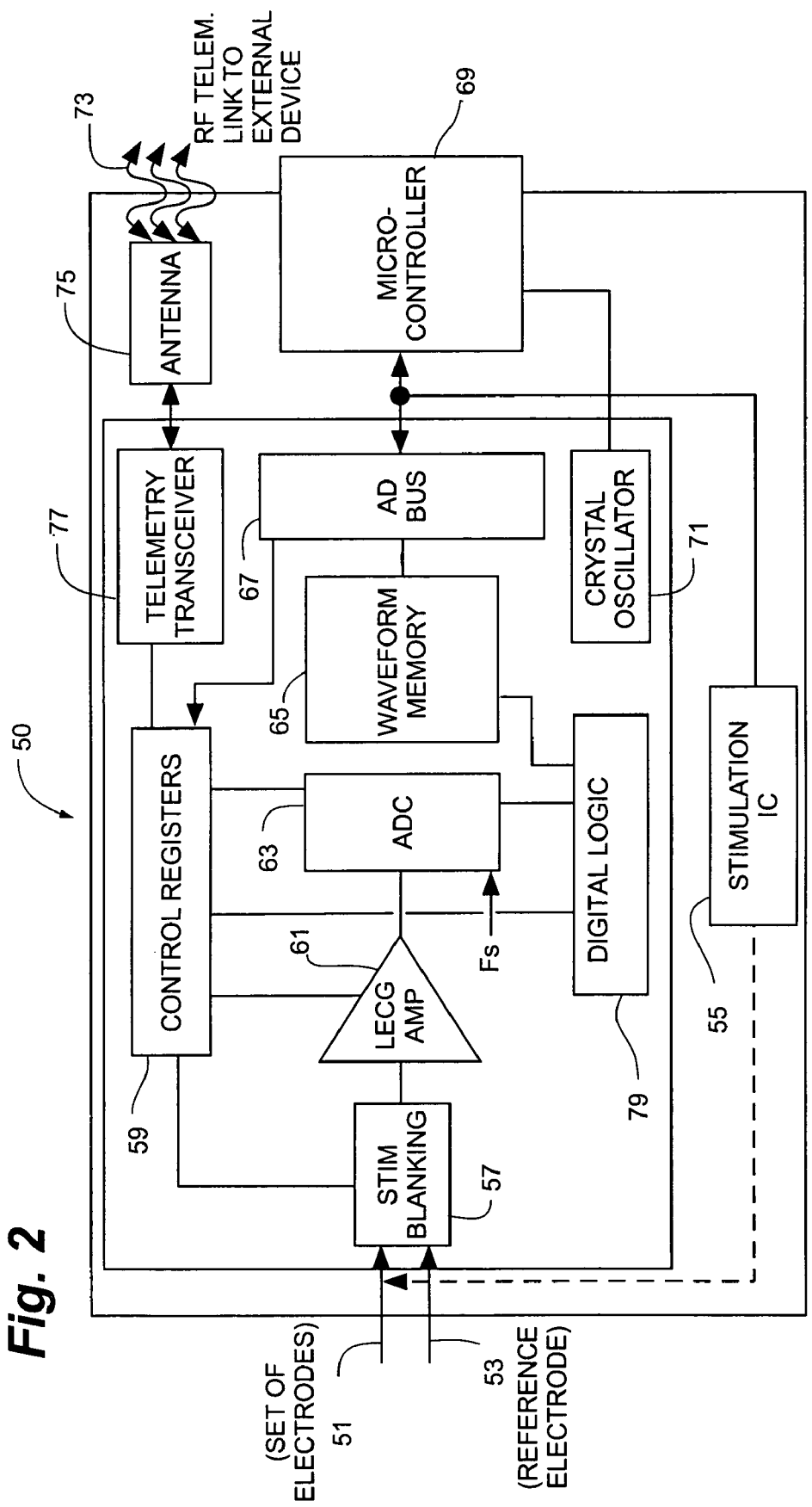
FIG. 2 is a schematic view of one IMD for epilepsy detection that can include the present invention.

FIG. 2 is a schematic block diagram of one implantable device 50, that can be used as or part of IMD 22 of FIG. 1. Implantable device 50 is implanted in conjunction with a set of electrodes 51. In some embodiments, the set of electrodes 51 comprises eight electrodes. A reference electrode 53 is another electrode that is not included in the set of electrodes 51 and is not typically as involved with the neurological activity as the set of electrodes 51. The apparatus 50 may communicate with an external device through a telemetry transceiver 77 through an antenna 75, and a telemetry link 73. External devices may collect data from the apparatus 50 by placing a patch antenna on the patient's body over the implantable device to thereby communicate with antenna 75 of apparatus 50.

Each electrode of the set of electrodes 51 may either receive a neurological signal or may stimulate surrounding tissue. Stimulation of any of the electrodes contained in the electrode set 51 is generated by a stimulation IC 55, as instructed by a microprocessor 69. Microprocessor 69 can be clocked by oscillator 71 and coupled to an address/data bus represented at 67. Bus 67 can be coupled to control registers 59 which can in turn be coupled to other components previously described. When stimulation is generated through an electrode, the electrode is blanked by a blanking circuit 57 so that a neurological signal is not received by channel electronics (e.g., amplifier 61). When microcontroller 69 determines that a channel shall be able to receive a neurological signal, an analog to digital converter (ADC) 63 samples the neurological signal at a desired rate (e.g., 250 times per second). The digitized neurological signal may be stored in a waveform memory 65 so that the neurological data may be retrieved by the apparatus 50 when instructed. In particular, a program for evaluating the signals stored in memory 65 may be executed by micro-controller 69. Digital logic 79 can be coupled to control registers 59, ADC 63, and waveform memory 65 in some embodiments. Digital logic 79 can execute at least some of the methods according to the invention in some embodiments.

While device 50 is illustrated as discrete components, the actual device may be implemented as a hybrid device, built of discrete digital logic. In particular, some or all of microprocessor 69 may be implemented using discrete logic.

FIG. 3 is a flowchart that illustrates methods 100 that can be used to implement the present invention. Such methods can, for example, be executed by micro-processor 69. FIG. 3 will be used to introduce the methods in general, at a high level, with more detailed and specific examples provided in the text that follows. At least 4 methods are illustrated in FIG. 3, as the first and last steps are optional, and therefore at least four combinations are provided by using no optional steps, the first, the last, or both the first and the last steps.

Methods 100 can be used to determine an approximate ratio R of a numerator N divided by a denominator D. By "fixed point", the present application refers to both signed and unsigned integers that may be interpreted as having implied scaling or fractional power of two bit positions. The most significant bit in an eight bit number may represent 128, 64, 1/2, etc. As used herein, the "most significant set bit" (MSSB) refers to the most significant bit set in the portion of the word that does not represent sign information.

Step 102 is optional, and may not be present in some embodiments. In step 102, the smaller of either the denominator (D) or the numerator (N) is preprocessed to round up the number. The optional step is referred to as "with rounding." A method according to the present invention can begin with either step 102 or 104.

One method of rounding is to add 1 to the bit position just to the right of the MSSB.

Step 104 begins with the value of D, either the original D or the result of rounding determined and stored in D_MSSB. The bit position of the most significant set bit (MSSB) in D indicates the magnitude of D. D_MSSB may be determined by counting the number of zeros to the left of the MSSB of D. The value of D may be bit shifted left to determine this value. In implementation, discrete logic may be used to rapidly determine the MSSB.

Step 106 is similar to step 104. In step 106, the MSSB is determined for N, and stored in N_MSSB. N_MSSB is an indication of relative magnitude of N. Again, N may be the original N or N after preprocessing by step 102.

In step 108, the approximate ratio R is determined by raising 2 to the power of the difference between N_MSSB and D_MSSB. In some methods, the value of R obtained from step 108 is used as the approximate ratio. In other methods, step 110 is used to post-process the ratio R. It may be noted that the result of step 108 will have only one significant bit.

In step 110, another significant bit or bits may be added to the result of step 108. In some methods, where M is chosen to be 1, then the bit to the right of the MSSB in R is set to have the value of the bit to the right of the MSSB of N. In other methods, where M is greater than 1, more than 1 bit of R is set to be equal to the corresponding bits of N. This aspect of the invention is referred to as "filling."

FIG. 4 illustrates a set of results 200 for division approximation using the present invention. The X-axis varies the denominator from 3 to 18 and varies the numerator repeatedly from 0 to 255 for each denominator. The Y-axis shows the various results. The denomination range of 3 to 18 is of particular interest for a seizure detection algorithm. Keep in mind that for more ready threshold applications or use with other implementations, the number of bits of input and the y-scale of the outputs can be easily gained/bit-shifted.

The true ratio is shown at 206. The result for subtraction is shown at 202. As can be seen, this is not scaled, as the subtraction values repeat themselves over the entire range of denominators. The results for the MSBR Ratio may be seen at 210. This is the basic algorithm, not having rounding or filling. This has a stair step shape, which has discontinuities, but tends to bracket the true ratio, both high and low. In some applications, this step function may not be appropriate. In other applications, the good on-average accuracy may be useful. The results for MSB Ratio rounded may be seen at 212. This is the method having the smaller of the numerator or denominator rounded up prior to the MSSB determinations. The Fill Bigger method is shown at 204, having the basic method plus the bit filling with 1 bit to the right. This does not have the stair step shape of the basic algorithm at 210, but is also further away from the true ratio 206 on average. The MSB Ratio Rounded and Filled result may be seen at 208, having the smaller of the denominator or numerator rounded up, followed by the basic algorithm, followed by filling 1 bit to the right. This may be seen to undershoot the true ratio 206 rather than bracket it as with MSB Ratio 210, but it lacks the stair step shape, and is closer on average than either the MSB Rounded 212 or MSB fill bigger 204. The various approximation methods may be used in various applications. These methods provide approximations to the true ratios that are much faster to compute than the true ratio calculations for fixed point numbers.

Thus, embodiments of implantable and wearable medical devices configured for division approximation are disclosed that can provide more rapid calculation of approximate ratios. One skilled in the art will appreciate that the present invention can be practiced with embodiments other than those disclosed. The disclosed embodiments are presented for purposes of illustration and not limitation, and the present invention is limited only by the claims that follow.

The invention claimed is:

1. A method for determining a physiological measurement ratio for incorporation in a neurological event detection calculation used to analyze a neurological event status of a patient and carried out by a self-powered Implantable Medical Device (IMD) or a self-powered wearable medical device, the method comprising:
   obtaining a first signal indicative of a first physiological measurement, wherein the first signal is represented in a first fixed point number;
   obtaining a second signal indicative of a second physiological measurement, wherein the second signal is represented in a second fixed point number;
   determining a ratio approximation of a ratio of the first fixed point number divided by the second fixed point number, the ratio approximation determining including raising 2 to the power of the difference between a most significant set bit position of the second fixed point number and a most significant set bit position of the first fixed point number; and
   detecting a neurological event based on the ratio approximation with the self-powered IMD or the self-powered wearable medical device.

2. The method of claim 1, in which the ratio approximation determining includes estimating the first fixed point number.

3. The method of claim 1, in which the ratio approximation determining includes estimating the second fixed point number.

4. The method of claim 1, in which the ratio approximation determining includes estimating the first and second fixed point numbers.

5. The method of claim 1, in which the ratio approximation determining comprises raising 2 to the power of the difference between the number of zeros to the left of the most significant set bit in the second fixed point number and the number of zeros to the left of the most significant set bit in the first fixed point number.

6. The method of claim 1, in which the first fixed point number is an average over a first time period and in which the second fixed point number is an average over a second time period, where the first time period is shorter than the second time period, and wherein the first and second signals are both derived from a common signal source.

7. The method of claim 6, in which the first time period is more recent than the second time period.

8. The method of claim 6, in which the first fixed point number is a function of brain neurological activity occurring during the first time period, and in which the second fixed point number is a function of average neurological activity occurring during the second time period.

9. The method of claim 1, in which the first fixed point number is indicative of a physiological signal and in which the second fixed point number is indicative of physiological noise.

10. The method of claim 1, further comprising setting a number of M bits to the right of a most significant set bit position of the ratio approximation to have the value as the same number of M bits just to the right of the most significant set bit position of the first fixed point number.

11. The method of claim 10, wherein M has a value of at least 1.

12. The method of claim 11, wherein M has a value equal to the absolute value of the difference between the most significant set bit position of the second fixed point number and the most significant set bit position of the first fixed point number.

13. The method of claim 1, further comprising rounding up the smaller of the first fixed point number and second fixed point number prior to determining the ratio approximation.

14. The method of claim 13, further comprising setting a number of M bits to the right of a most significant set bit position of the ratio approximation to have the value as the same number of M bits just to the right of the most significant set bit position of the first fixed point number.

15. A computer readable medium having computer executable instructions for executing the method of claim 1.

16. A self-powered implantable or wearable medical device having executable instructions or logic for executing the method of claim 1.

17. A method for determining a ratio approximation for incorporation in a neurological event detection calculation used to analyze a neurological event status of a patient and carried out by a self-powered implantable or wearable medical device, the method comprising:
    obtaining a first fixed point number correlated to a first physiological parameter measurement;
    obtaining a second fixed point number correlated to a second physiological parameter measurement;
    calculating a ratio approximation of the first fixed point number over the second fixed point number by using a method consisting essentially of raising 2 to the power of the difference between a most significant set bit position of the second fixed point number and a most significant set bit position of the first fixed point number; and
    detecting a neurological event based on the ratio approximation with the self-powered implantable or wearable medical device.

18. The method of claim 17, in which the first and second physiological parameter measurements are both derived from the same physiological source, but where the second physiological parameter measurement is a background level measurement and the first physiological parameter measurement is a more recent measurement than the second physiological parameter measurement.

19. The method of claim 17, in which the first and second physiological parameter measurements are both derived from the same source but over different time periods.

20. A computer readable medium having computer executable instructions for executing the method of claim 17.

21. A self-powered implantable or wearable medical device having executable instructions or logic for executing the method of claim 17.

22. A method for characterizing neurological energy for incorporation in a neurological event detection calculation carried out by a self-powered implantable or wearable medical device to analyze a neurological event status of a patient, the method comprising:
    obtaining a first fixed point number correlated to a foreground neurological energy measured by the self-powered implantable or wearable medical device;
    obtaining a second fixed point number correlated to a background neurological energy measured by the self powered implantable or wearable medical device; and
    determining with the self-powered implantable or wearable medical device an approximate ratio of the foreground neurological energy divided by the background neurological energy by calculating an approximate ratio of the first fixed point number over the second fixed point number by using a method consisting essentially of raising 2 to the power of the difference between a most significant set bit position of the second fixed point number and a most significant set bit position of the first fixed point number.

23. The method of claim 22, further comprising setting a number of M bits to the right of a most significant set bit position of the approximate ratio to have the value as the same number of M bits just to the right of the most significant set bit position of the first fixed point number.

24. The method of claim 23, wherein M has a value of at least 1.

25. The method of claim 24, wherein M has a value equal to the absolute value of the difference between the most significant set bit position of the second fixed point number and the most significant set bit position of the first fixed point number.

26. The method of claim 22, further comprising rounding up the smaller of the first fixed point number and second fixed point number prior to determining the ratio approximation.

27. The method of claim 26, further comprising setting a number of M bits to the right of a most significant set bit position of the approximate ratio to have the value as the same number of M bits just to the right of the most significant set bit position of the first fixed point number.

28. An implantable medical device having a processor programmed with instructions for executing a method for analyzing neurological energy for incorporation in a neurological event determination, the method comprising
    obtaining a first fixed point number correlated to a foreground neurological energy;
    obtaining a second fixed point number correlated to a background neurological energy; and
    determining an approximate ratio of the foreground neurological energy divided by the background neurological energy by calculating an approximate ratio of the first fixed point number over the second fixed point number by using a method consisting essentially of raising 2 to the power of the difference between a most significant set bit position of the second fixed point number and a most significant set bit position of the first fixed point number.

29. A wearable medical device having a processor programmed with instructions for executing a method for analyzing neurological energy for incorporation in a neurological event determination, the method comprising
    obtaining a first fixed point number correlated to the foreground neurological energy;
    obtaining a second fixed point number correlated to the background neurological energy; and
    determining an approximate ratio of a foreground neurological energy divided by a background neurological energy by calculating an approximate ratio of the first fixed point number over the second fixed point number by using a method consisting essentially of raising 2 to the power of the difference between a most significant set bit position of the second fixed point number and a most significant set bit position of the first fixed point number.

30. A computer readable medium having computer executable instructions for causing a processor to execute a method for analyzing neurological energy for incorporation in determining the occurrence of a neurological event in a patient, the method comprising
    obtaining a first fixed point number correlated to a foreground neurological energy of the patient;
    obtaining a second fixed point number correlated to a background neurological energy of the patient; and
    determining an approximate ratio of the foreground neurological energy divided by the background neurological energy by calculating an approximate ratio of the first fixed point number over the second fixed point number by using a method consisting essentially of raising 2 to the power of the difference between a most significant set bit position of the second fixed point number and a most significant set bit position of the first fixed point number.

* * * * *